J. E. LEWIS.
Coffee Pot.
No. 93,317. Patented Aug. 3, 1869.
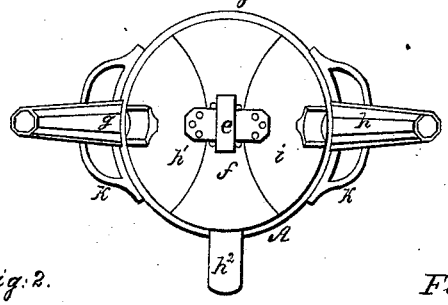
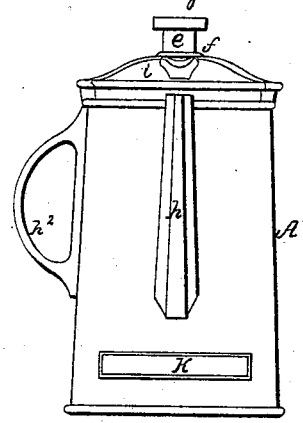
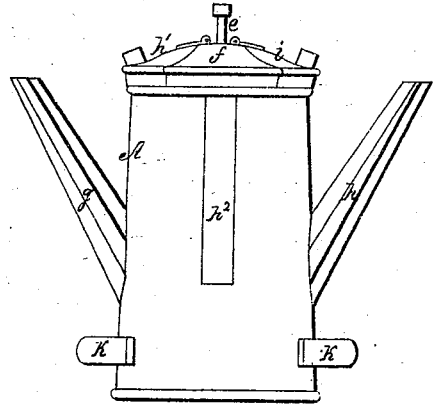
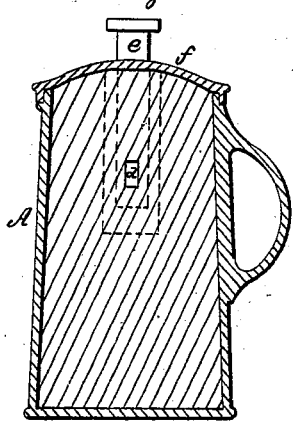
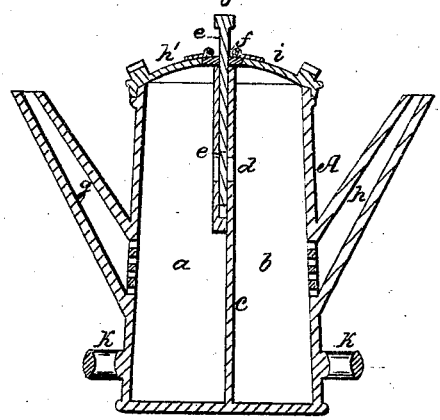
Witnesses:
S. N. Piper
J. R. Snow
John E. Lewis
by his attorney

United States Patent Office.

JOHN E. LEWIS, OF KITTERY, MAINE.

Letters Patent No. 93,317, dated August 3, 1869.

IMPROVEMENT IN COFFEE-POTS.

The Schedule referred to in these Letters Patent and making part of the same.

*To all persons to whom these presents may come:*

Be it known that I, JOHN E. LEWIS, of Kittery, of the county of York, and State of Maine, have made a new and useful invention, having reference to Coffee-Pots or Teapots; and do hereby declare the same to be fully described in the following specification, and represented in the accompanying drawings, of which—

Figure 1 is a top view,
Figure 2, a front elevation,
Figure 3, a side view, and
Figures 4 and 5, vertical sections of what I term my invention, it being a duplex coffee-pot.

In the drawings—

A denotes the body, which is a hollow vessel, having its interior space divided into two compartments $a\ b$, by means of a partition, $c$, extended across it.

Through the said partition, there is an opening, $d$, provided with a slide-valve or gate, $e$, whose stem extends above the partition and out of the top $f$ of the vessel A.

To each of the compartments $a\ b$ there is an educt or nose, as shown at $g$ and $h$, and there is also a cover to each of such compartments, the same being as shown at $h$ and $i$.

Below such spout is a handle, $k$, and there is also another handle, $h^2$, arranged between the two spouts, the whole being as represented in the drawings.

One of the lateral handles is to be grasped in one hand of a person, while with his other hand he may have hold of the middle handle, the two handles thus enabling him to support and tip the vessel to better advantage than he could with but one handle.

With the article so constructed, an infusion of tea may be made in one of the compartments, and at the same time a decoction of coffee may be in the act of being made in the other. Water may be heated or kept in one compartment, while tea or coffee may be in process of being steeped in the other.

The valve or gate and its passage serve to admit water from one compartment to the infusion or decoction in the other, as may be required.

If desirable, there may be a stopper to the discharging-end of each nose, such being either a cap or thimble to fit on the nose, or a plug to go into it.

I claim the duplex coffee-pot as made with the two compartments, the communicating-passage, and the gate thereof, the two noses or discharging-spouts, and one or more handles, the whole being substantially as set forth.

JOHN E. LEWIS.

Witnesses:
R. H. EDDY,
S. N. PIPER.